United States Patent [19]

Lievesley

[11] Patent Number: 4,585,269
[45] Date of Patent: Apr. 29, 1986

[54] VEHICLE SUN ROOFS

[75] Inventor: John B. Lievesley, Kidderminster, England

[73] Assignee: Autoroofs Limited, Great Britain

[21] Appl. No.: 626,199

[22] Filed: Jun. 29, 1984

[30] Foreign Application Priority Data

Jul. 4, 1983 [GB] United Kingdom ............... 8318094

[51] Int. Cl.$^4$ ............................................. B60J 7/04
[52] U.S. Cl. ................................................... 296/214
[58] Field of Search ............. 296/214, 216, 218, 222, 296/221

[56] References Cited

U.S. PATENT DOCUMENTS

| 4,293,161 | 10/1981 | Lutz ................................. | 296/214 |
| 4,312,533 | 1/1982 | Jardin et al. ..................... | 296/214 |
| 4,337,947 | 7/1982 | Kohlpaintner et al. ........... | 296/216 |
| 4,484,449 | 12/1984 | Igel et al. ......................... | 296/216 |

FOREIGN PATENT DOCUMENTS 1414444 11/1974 United Kingdom .
2034256 6/1980 United Kingdom .

Primary Examiner—Robert R. Song
Attorney, Agent, or Firm—Wegner & Bretschneider

[57] ABSTRACT

A frame for a vehicle sun roof intended for a vehicle having a hard head liner comprises an outer upper frame section adapted to fit into an aperture in a vehicle roof and to engage said roof around the edge of said aperture, an inner frame section adapted to be located below the vehicle roof and to be secured to the outer frame section and a support member adapted to be fitted to the inner frame section and to engage the underside of the vehicle roof around the edge of the aperture. The support member is made of resilient material and is provided with a lip which is adapted to engage a hard head liner of the vehicle roof around the edge of an aperture formed therein to accommodate the frame in order to conceal the aperture in the head liner from view and to provide a support for the head liner. A strip of trimming fabric may be provided to cover the support member and inner frame section, the trimming fabric being held between the lip formed on the support member and the hard head liner along one edge and the opposite edge being held in place by a trimming strip of resilient material which is inserted into a gap formed between the outer and inner frame sections.

11 Claims, 2 Drawing Figures

VEHICLE SUN ROOFS

BACKGROUND OF THE INVENTION

This invention relates to improvements in vehicle sun roofs.

Some motor vehicles on the market today employ a hard head liner for the vehicle roof which is often contoured. When fitting a sun roof to such a vehicle it is necessary to cut an aperture not only in the roof of the vehicle but also in the head liner in order to accommodate the frame of the sun roof. The sun roof frame normally consists of an outer upper section and an inner lower section and the sections are so arranged as to grip between them the vehicle roof around the edge of the aperture cut therein. It may be possible to clamp the head liner material between the two frame sections but this leaves the frame exposed and is unsightly. When the head liner does not closely follow the contour of the vehicle roof, or is deeply profiled, this method is unsatisfactory. Therefore a somewhat larger aperture must be cut in the head liner material to allow the lower frame section to pass through the aperture in the head liner and to engage with the edge of the aperture in the vehicle roof itself. A gap is therefore left between the edge of the aperture in the head liner and the outer edge of the lower frame section of the sun roof which gap is rather unsightly. Further, the edges of the head liner around the aperture are unsupported.

This gap presents a difficult finishing problem to which frequently the only solution is to make up and fit a new fabric head liner. Such a method is time-consuming and expensive. Even where the original hard head liner is fabric faced, so that the fabric may be carefully peeled away from an aperture cut inside the line of the frame, the excess backing material removed and the fabric then tucked around the lower section of the frame, considerable extra time, skill and expense are involved.

SUMMARY OF THE INVENTION

The object of the present invention is to provide a vehicle roof with a frame having means for hiding the aperture in a hard head liner of a vehicle roof and to provide a support for said head liner.

According to the invention, there is provided a frame for a vehicle sun roof intended for a vehicle having a hard head liner, which frame comprises an outer upper frame section adapted to fit into an aperture in a vehicle roof and to engage said roof around the edge of said aperture, an inner lower frame section adapted to be located below the vehicle roof and to be secured to said outer frame section, and a support member adapted to be fitted to the outer peripheral portion of said inner lower frame section and to engage the underside of said vehicle roof around the edge of said aperture, said support member being made of resilient material and being provided with an outwardly extending lip adapted to engage a hard head liner of the vehicle roof around the edge of an aperture formed therein to accommodate said frame in order to conceal the aperture in said head liner from view and to provide a support for said head liner.

Preferably, the support member comprises a strip of rubber or like resilient material having a groove adapted to receive a ridge or a tongue provided on the inner frame section.

The outer frame section is desirably provided with an upstanding rib which is adapted to bear against the inner frame section or a rib on said inner frame section when the said inner frame section is secured to the outer frame section.

A trimming fabric, which is preferably designed to match the material of the head liner, is desirably fitted to the sun roof frame, said trimming fabric being arranged to cover the inner frame section. The trimming fabric may also be arranged to cover the support member and be held in place between the support member and the hard head liner by virtue of the resilience of the lip provided on the support member. The trimming fabric may additionally be secured in place by means of a suitable adhesive.

BRIEF DESCRIPTION OF THE DRAWINGS

The invention will now be further described, by way of example, with reference to the drawings, in which.

In the drawings, like parts are denoted by like reference numerals.

DESCRIPTION OF PREFERRED EMBODIMENTS

Figure 1:
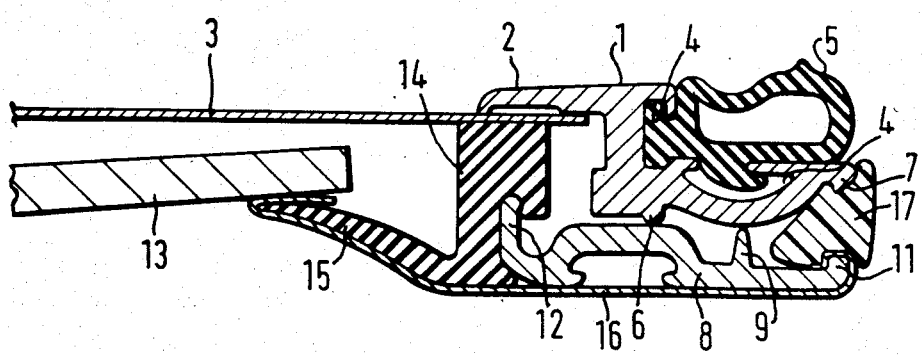
FIG. 1 is a vertical section through part of one embodiment of a frame for a vehicle sun roof according to the invention.

Reference will first be made to FIG. 1 of the drawings in which the frame consists of an outer upper frame section 1 which has a flange 2 adapted to rest on a vehicle roof 3 around the edge of an aperture cut in the vehicle roof and through which the main body of the frame section 1 extends. The frame section 1 is further provided with recesses or slots 4 for the reception of a sealing gasket 5 against which the roof panel (not shown) of the vehicle sun roof is designed to seat when the panel is in the closed position. The underneath surface of the frame section 1 is essentially arcuate and terminates adjacent the outer edge in a rib 6 while a lip 7 is provided adjacent the inner edge of said surface.

An inner lower frame section 8 is adapted to be secured to the upper frame section 1 by means of screws or the like (not shown). The lower frame section 8 is provided with an upstanding rib 9 designed to abut the arcuate surface of the frame section 1 while the rib 6 on the upper frame section bears against a flattened region of the lower frame section 8. The inner edge of the frame section 8 is provided with a lip 11 and the outer edge is provided with an upstanding rib 12 which terminates short of the vehicle roof 3.

A support member 14 in the form of a shaped strip of rubber or like resilient material is provided with a groove adapted to receive the rib 12 on the frame section 8 so that the support member 14 is positively located in position. A resilient lip 15 extends from the outer surface of the support member 14. The support member 14 will normally be fitted to the frame section 8 before the frame is fitted to the vehicle roof 3 and said support member may be secured to the frame section 8 by means of a suitable adhesive.

In order to fit the frame to the vehicle roof 3, an aperture must first be cut or otherwise formed in the vehicle roof and a larger aperture must be cut or otherwise formed in a hard head liner 13 for the lower frame. The upper frame section 1 is then fitted into the aperture so that the flange 2 rests on the vehicle roof 3 around the edge of the aperture in the vehicle roof. A resilient seal of rubber or like material (not shown) should desirably be provided between the flange 2 and roof 3. The lower frame section 8 with the support member 14 fitted thereon is then offered up to the upper frame section 1. The support member is so arranged that its upper surface makes contact with the underside of the vehicle roof 3 before the ribs 6 and 9 engage the respective opposite frame sections 8 and 1.

The edge of a strip of trimming fabric 16 is bent round the edge of the lip 15 and is thus sandwiched between said lip and the hard head liner 13 as the support member 14 engages the underside of the vehicle roof 3. If desired, adhesive may be applied to the upper surface of the lip 15, prior to fitting, for additional security. The lower frame section 8 can now be secured to the upper frame section 1, for example by means of screws (not shown), and the frame section 8 is drawn upwards until the ribs 6 and 9 abut respectively against the frame sections 8 and 1. The resilient material of the support member 14 is thereby deformed and the frame is positively held in the roof aperture. The resilient lip 15 is also deformed and is urged more strongly against the head liner 13 to hold said head liner and the edge of the trimming fabric 16 in position.

Fitting is completed by pulling the trimming fabric over the lower surfaces of the support member 14 and lower frame section 8 and by pushing the inner edge into the gap between the upper and lower frame sections. A trim retaining strip 17 is then inserted into this gap and is held in position by engagement with the lips 7 and 11 on the upper and lower frame sections 1 and 8 respectively.

The upper and lower frame sections 1 and 8 will normally be made of extruded aluminium alloy sections but other methods of manufacture and other materials such as different metals or alloys or even suitable synthetic plastics materials may be used if desired.

Figure 2:
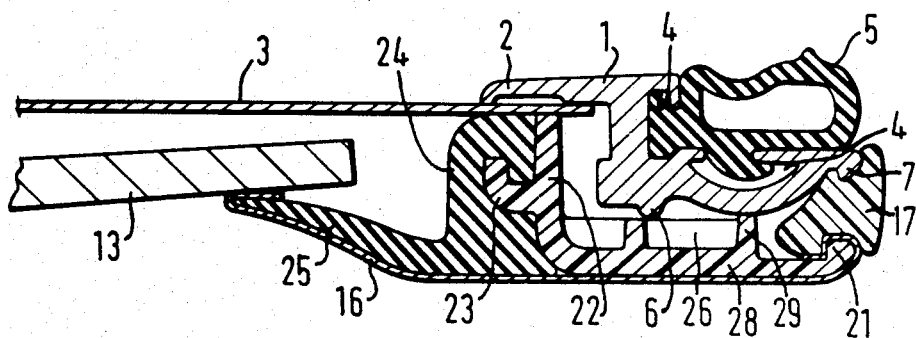
FIG. 2 is a vertical section through part of a second embodiment of a frame for a vehicle sun roof according to the invention.

If the frame is to be made of a moulded plastics material or is to be a die casting, the lower frame section preferably has the configuration of the lower frame section 28 shown in FIG. 2 of the drawings. This frame section has a first upstanding rib 29, which corresponds to the upstanding rib 9 of the frame section 8 and which is designed to abut against the arcuate surface of the frame section 1, and a stiffening cross rib 26 which is designed to abut against the rib 6 on the frame section 1. The inner edge of the frame section 28 is provided with a lip 21, which corresponds to the lip 11 on the frame section 8, while the outer edge is provided with an upstanding rib 22 which is designed to abut against the underneath surface of the vehicle roof 3. An L-shaped tongue 23 is provided on the outer side of the rib 22.

In this embodiment, the support member 14 is replaced by a support member 24 which is likewise in the form of a strip of rubber or like resilient material. The support member 24 is provided in one side of an L-shaped groove which is adapted to receive the L-shaped tongue 23 on the lower frame section 28 so that the support member 24 is positively located in position. A resilient lip 25 extends from the outer surface of the support member 24. Again, the support member 24 will normally be fitted to the frame section 28 before the frame is fitted to the vehicle roof 3 and the support member may be secured to the frame section 28 by means of a suitable adhesive.

Fitting of the frame shown in FIG. 2 of the drawings to a vehicle roof 3 is similar to the embodiment shown in FIG. 1 of the drawings in that an aperture must first be cut or otherwise formed in the vehicle roof and a larger aperture must be cut or otherwise formed in the hard head liner 13. The upper frame section 1 is then fitted into the aperture so that the flange 2 rests on the vehicle roof 3 around the edge of the aperture in the vehicle roof. Again, a resilient seal of rubber or like material (not shown) should desirably be provided between the flange 2 and roof 3. The lower frame section 28 with the support member 24 fitted thereon is then offered up to the upper frame section 1. The support member 24 and the rib 22 on the frame section 28 are so arranged that they make contact with the underside of the vehicle roof 3 before the ribs 6 and 26 engage one another and before the rib 29 engages the arcuate surface on the upper frame section 1.

As in FIG. 1, the edge of a strip of trimming fabric 16 is bent round the edge of the lip 25 and is thus sandwiched between said lip and the hard head liner 13 as the support member 24 and rib 22 engage the underside of the vehicle roof 3. As before, adhesive may be applied to the lip 25, prior to fitting, to provide additional security for the strip of trimming fabric 16. The lower frame section 28 can now be secured to the upper frame section 1, for example by means of screws (not shown), and the frame section 28 is drawn upwards until the ribs 6 and 26 engage one another and the rib 29 abuts against the arcuate surface on the upper frame section 1. The resilient material of the support member 24 is thereby deformed and the frame is positively held in the roof aperture. The resilient lip 25 is also deformed and is urged more strongly against the head liner 13 to hold said head liner and the edge of the trimming fabric 16 in position.

Fitting is again completed by pulling the trimming fabric over the lower surfaces of the support member 24 and lower frame section 28 and by pushing the inner edge of said fabric into the gap between the upper and lower frame sections. The trim retaining strip 17 is then inserted into the gap and is held in position by engagement with the lips 7 and 21 on the upper and lower frame sections 1 and 28 respectively as with the embodiment shown in FIG. 1 of the drawings.

The strip of trimming fabric 16 is preferably chosen to match the surface of the head liner 13 but this is not essential and contrasting materials and/or colours may be selected if desired.

In both of the above-described embodiments, the frame will further be provided with hinges and one or more latch mechanisms for a roof panel (not shown). These fittings are well known to those skilled in the art and do not form part of the present invention.

It will be seen that the support member 14 or 24, which in each case is essentially a block of resilient material having a resilient lip attached thereto, is capable of hugging the profile of a contoured head liner of a vehicle roof to hold the same in position and to hide what would otherwise be a rather unsightly gap. Moreover, the lip 15 or 25 provides a firm and secure support for the head liner.

The invention is not restricted to the above described embodiment but variations and modifications may be made without departing from the scope of the invention.

What is claimed is:

1. A frame for a vehicle sun roof intended for a vehicle having a hard head liner, said frame comprising an outer upper frame section adapted to fit into an aperture in a vehicle roof and to engage said roof around the edge of said aperture, an inner lower frame section adapted to be located below the vehicle roof and to be secured to said outer frame section, and a support member adapted to be fitted to the outer peripheral portion of said inner lower frame section and to engage the underside of said vehicle roof around the edge of said aperture, said support member being made of resilient material and being provided with an outwardly extending lip adapted to engage a hard head liner of the vehicle roof around the edge of an aperture formed therein to accommodate said frame in order to conceal the aperture in said head liner from view and to provide a support for said head liner.

2. A frame as claimed in claim 1, in which said support member comprises a strip of rubber or like resilient material.

3. A frame as claimed in claim 1, in which said support member is provided with a groove adapted to receive a ridge provided on the said inner frame section.

4. A frame as claimed in claim 1, in which said inner frame section is provided with an upstanding rib adapted to engage the underneath surface of a vehicle roof when said frame is installed in a vehicle.

5. A frame as claimed in claim 4, in which said support member is provided with a groove adapted to receive a tongue provided on the upstanding rib on said inner frame section.

6. A frame as claimed in claim 1, in which said inner frame section is provided with an upstanding rib which is adapted to engage an arcuate surface provided on said outer frame section when said inner frame section is secured to said outer frame section.

7. A frame as claimed in claim 1, in which said outer frame section is provided with an upstanding rib which is adapted to bear against the inner frame section when said inner frame section is secured to said outer frame section.

8. A frame as claimed in claim 7, in which the rib on said outer frame section is adapted to engage a rib provided on the inner frame section when said inner frame section is secured to said outer frame section.

9. A frame as claimed in claim 1, in which, when said inner frame section is secured to said outer frame section, a gap is formed between said frame sections and in which said frame sections are provided with lips facing towards one another and located in said gap.

10. A frame as claimed in claim 9, in which a strip of trimming fabric is arranged to cover the inner frame section and the support member and is arranged to be held in place beween the hard head liner and the lip on said support member by virtue of the resilience of the material of the lip.

11. A frame as claimed in claim 10, in which the strip of trimming fabric is held in position covering the inner frame section by inserting the edge of said fabric into the gap between sections and by inserting a retaining strip into said gap, the retaining strip being held in place in the gap by engagement with the lips on said frame sections.

* * * * *